May 28, 1957
D. CUTRERA
2,793,392
POULTRY DEBONER
Filed Jan. 6, 1955
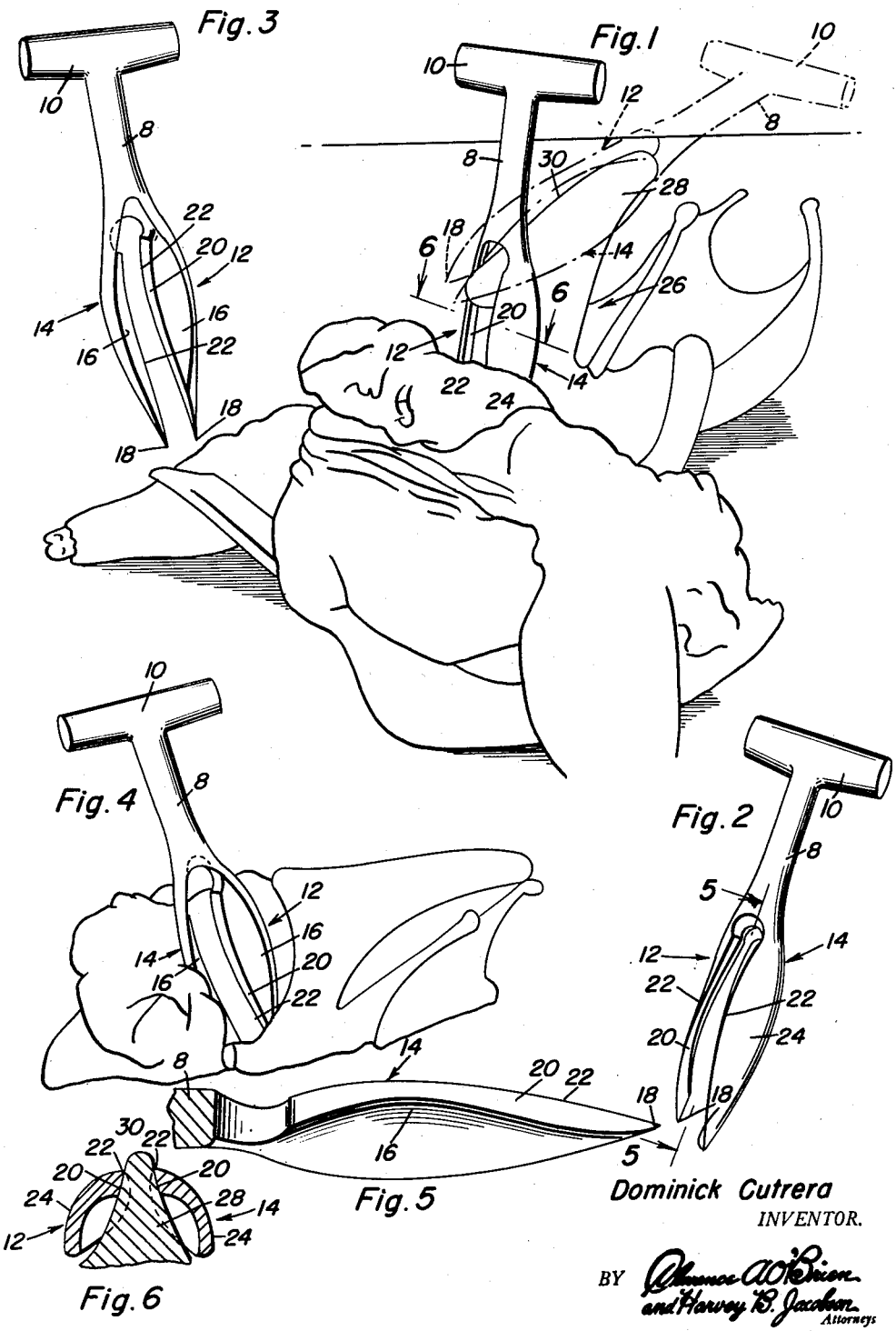
Dominick Cutrera
INVENTOR.

2,793,392
POULTRY DEBONER

Dominick Cutrera, San Francisco, Calif.

Application January 6, 1955, Serial No. 480,227

1 Claim. (Cl. 17—11)

The present invention relates to a hand tool or implement which is expressly designed and adapted for use by poulterers and which lends itself to the often difficult task of deboning poultry, for example, chickens, ducks and turkeys.

It is a matter of common knowledge to those conversant with the problem of removing the carcass from a whole turkey or chicken, that it is one which challenges even the skill and accepted technique of a poulterer or butcher, if that be the case, inasmuch as there are no special and satisfactory tools to assist one in handily cleaving the raw meat from the breast bone of the carcass. To be sure, a butcher equipped with the best available knives and possessed of time and patience can always do the desired job well. The fact remains, however, that there exists a need for a handy tool which will part the meat and strip it from the carcass, especially the breast bone, with requisite finesse. It follows that the object of the instant invention is to provide a hand tool or implement to assist the user in stripping the meat from the carcass and removing the carcass with the meat remaining intact and virtually unimpaired and so that it may be restored for subsequent stuffing and cooking, or for such other purposes as may be under consideration.

In carrying out a preferred embodiment of the invention, suitably designed prongs are paired, spaced apart and attached to an appropriate handle and are suitably shaped and sharpened to straddle and traverse the breast bone from rear to front in a manner to separate the bone from the meat and to dilate and fold the meat during the advancing step of the deboner, all in a highly satisfactory and feasible manner.

Other objects, features and advantages will become more readily apparent from the following description and the accompanying sheet of illustrative drawings.

In the drawings, wherein like numerals are employed to designate like parts throughout the views:

Figure 1 is a perspective view showing the improved deboner in both full and phantom lines and illustrating, in full lines, the manner in which the prongs straddle and ride the breast bone and "peel" the meat and lay it back for dislodgement and removal of the carcass;

Figure 2 is a perspective view of the deboner or tool by itself observing what may be called the front or top side of the same;

Figure 3 is a perspective view of the reverse or bottom side;

Figure 4 is another fragmentary perspective view showing the deboner or tool in its final finished position;

Figure 5 is an enlarged fragmentary section taken on the plane of the line 5—5 of Figure 2, looking in the direction of the arrows; and Figure 6 is a cross-section fragmentarily taken on the plane of the line 6—6 of Figure 1, looking in the direction of the arrows.

Referring now to the drawings and with reference, for example, to Figures 2, 3 and 5, it will be seen that the implement or tool as an entity resembles a heavy duty, so to speak, fork. Actually, the tool is preferably a one-piece stainless steel instrumentality which is sturdy and in practice is approximately of an over-all length of some six or eight inches. It is preferably of one-piece construction, but, of course, the handle and head means might well be separate and separate materials if the manufacturer is so inclined. Here, however, a one-piece instrument is shown and it comprises a shank 8 with a grip 10 at one end forming what may be called a T-shaped handle. At the outer end of the handle are the aforementioned elongate spaced stripping prongs or fingers separated by a longitudinally extending medial slot. These are perhaps best identified as prongs and sections 12 and 14. Actually, they are of identical construction, and the description of one will suffice for both. Looking down on the instrument, assuming that it was lying flat on a table or other support, the prongs may be said to be approximately semi-ovate in plan, either bottom or top. It will be noticed that the bottom surfaces are recessed and thus may be said to be concave, as denoted at 16 in Figure 5. This semi-ovate configuration causes the leading or piloting ends or terminals of the prongs to be not only narrow but actually sharp-pointed, as denoted at 18. The inner adjacent lengthwise edges 20 diverge away from each other, as shown in the position of use in Figure 6. The upper or extreme edges are sharpened and provide external cutting edges 22 for cleaving or stripping the meat from the carcass. The advancing or upward surfaces are convex, as at 24. It will be noticed, too, as brought out in Figure 6, that the two prongs diverge outwardly and downwardly. The points 18 are satisfactory for penetrating and piloting during the initial stage of operation, but the cutting edges are essential in severing the meat while the convex surfaces 24 cam and fold the meat so that it is laid back and the rear open end of the turkey or chicken, as the case may be, is thus dilated, sufficiently so that when the meat is removed, the carcass is clearly visible and may be dislodged and extracted. Incidentally, the carcass is denoted in Figure 1 by the numeral 26 and the breast bone at 28 and the crest or ridge of the breast bone at 30. The breast bone in cross-section is approximately V-shaped, as is evident from Figure 6, so therefore, the prongs with their advancing cutting edges and cam surfaces aptly straddle the breast bone, and when the tool is moved from rear to front, the meat is stripped, peeled and laid open in the intact manner evident from the drawings. It is further noticeable that the cutting edges themselves are bowed in a lengthwise direction and, obviously, all of these structural facets cooperate in effectually attaining the intended deboning operation.

The poulterer or other user will find that when setting out, or starting the use of the deboner knife, it is usually desirable to make an incision inside of the breast bone after which the tool is placed so that its prongs straddle the breast bone. Then, with the tool pushed in and with the bight of the crotch portion 15 riding the breast bone, a steady advancing or forward motion of the prongs and consequently the cutting edges will not only satisfactorily start but complete the processing wanted or needed. The drawings herein are sufficient, it is believed, to aptly reveal the successive, starting, intermediate and finishing steps. Actually, Figure 4 shows the work completed. The meat, as is obvious, is solid and undisturbed and may be restored, notwithstanding the dilation which has taken place, and stuffed for cooking, or, if preferred, cut up for canning or other processing requirements.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A poultry deboning tool having a semi-ovate cross section containing a medial slot extending longitudinally thereof to provide two sections each terminating at one end in a point, said tool having an opposite end terminating in a handle, and said tool having sharp external edges defining said slot.

References Cited in the file of this patent

UNITED STATES PATENTS

| | | |
|---|---|---|
| 954,084 | Gelbman | Apr. 5, 1910 |
| 1,442,577 | Kugel et al. | Jan. 16, 1923 |

FOREIGN PATENTS

| | | |
|---|---|---|
| 534,494 | Germany | Sept. 26, 1931 |